No. 859,105. PATENTED JULY 2, 1907.
H. G. PORTER.
STRAINER AND CLIP THEREFOR.
APPLICATION FILED MAR. 12, 1907.

Witnesses:
Max Pr. A. Doring.
George Calvert

Harry G Porter Inventor
By his Attorneys Henry T Gough

THE NORRIS PETERS CO., WASHINGTON, D. C.

UNITED STATES PATENT OFFICE.

HARRY G. PORTER, OF GREGORY, MICHIGAN.

STRAINER AND CLIPS THEREFOR.

No. 859,105.  Specification of Letters Patent.  Patented July 2, 1907.

Application filed March 12, 1907. Serial No. 362,042.

*To all whom it may concern:*

Be it known that I, HARRY G. PORTER, a citizen of the United States, residing at Gregory, in the county of Livingston and State of Michigan, have invented certain new and useful Improvements in Strainers and Clips Therefor, of which the following is a specification.

My invention relates to clips for temporarily attaching strainers to the spout of tea pots, or like vessels, and more particularly to a clip made of resilient wire, so bent as to engage with the end of the spout.

The object of my invention is to provide a clip of this character of great cheapness and simplicity, which shall not only be easily attachable and detachable but which shall be capable of being easily compressed or opened in order to be accommodated readily to different sized spouts or to different thickness of material.

My invention consists in the detail construction hereafter described and particularly set forth in the claims.

Figure 1:
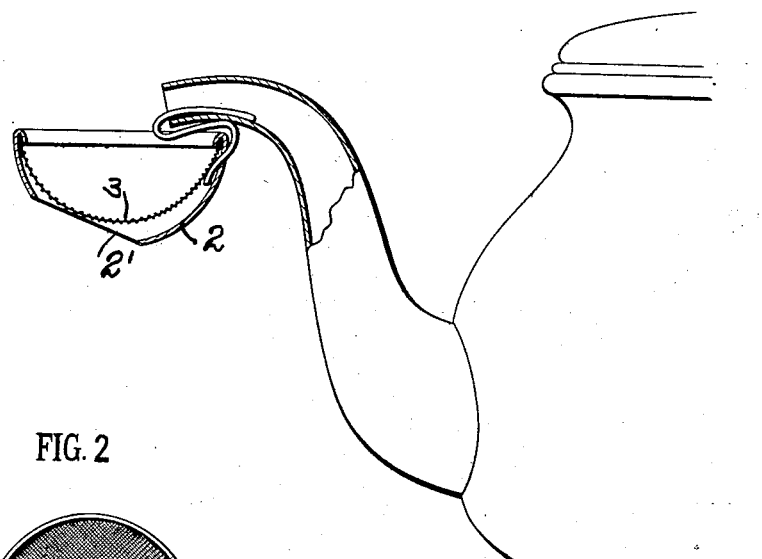
Figure 2:
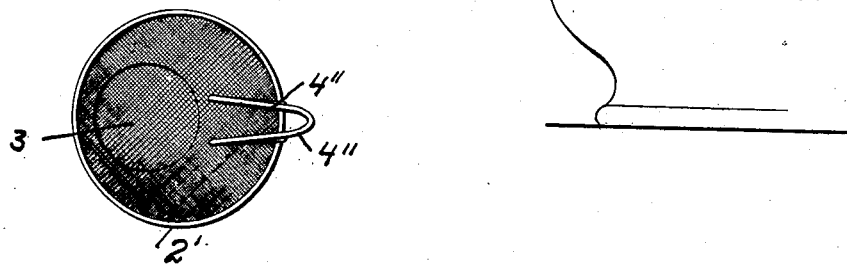
Figure 3:
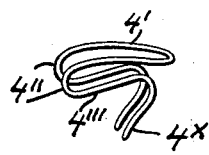
Figure 4:
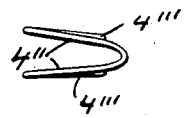
Figure 5:
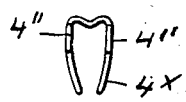

In the accompanying drawing, Figure 1 is a sectional view of a strainer as applied to a spouted vessel showing a side view of my clip. Fig. 2 is a top view of the strainer and clip. Fig. 3 is a perspective of the clip alone. Fig. 4 is a top view of the clip, and Fig. 5 is a front end view.

Like numerals designate like parts in all the figures, and therein 2 designates the usual strainer casing, a partly hemispherical shell of metal, cut out on its under side as at 2′ and having its upper edge turned over to receive and hold the edge of the hemispherical web 3, of wire mesh.

The clip is made of one piece of wire, bent upon itself at its middle to form two legs 4′; these extend inwardly; then are bent directly downwardly and forwardly as at 4″ and extended forwardly as at 4‴, directly beneath and in a vertical plane with that portion of the legs above them. The portions 4‴ are also inclined upwards or towards the joined ends of the legs 4′, and are then bent downwardly and slightly rearwardly, as at 4× for insertion into two adjacent holes formed through the shell 2 near its rear. The two ends of the clip project down through these holes and into the space between the wire netting 3 and shell 2, and extend downward a short distance against the inside wall of the shell to which they may be soldered if desired.

The particular point of my invention lies in the bend 4″ being entirely in a vertical plane, which brings the portion 4‴ directly above the portion 4′. The two portions 4′ 4′ are parallel to each other along their whole length; the bends 4″ are parallel to each other, and the portions 4‴ are also parallel to each other and vertically in plane with 4′.

The form of strainer must be adapted to be applied to vessels whose spouts are made of variable thickness,— and hence the bend 4″ must be such as may be easily compressed or spread as the necessities of the case require. This can only be attained by bending the clip so that the portions 4′ 4‴ and the bend 4″ are in the same plane with each other. If they are not in the same plane, the wire is twisted on itself, acquires a spring tension thereby, and as a consequence the bend cannot be compressed, nor can the two portions 4′ and 4‴ be brought permanently nearer to each other. If, for instance, the portions 4‴ are on either side of the portions 4′, the bend 4″ on each leg will be inclined downward and outward and will act as a spring. Any effort then to bring the loop 4′ nearer to the portion 4‴ will merely increase the torsion of the wire and the moment the force is relaxed, the bend will spring up again. Any compression of the bend in this case will do no good either, as the bends being inclined it will merely spread the loop 4′. With my construction, however, the wire in bend 4″ not being twisted, the bend is easily compressed or expanded and the clip thus made to adapt itself to any thickness of material in the spout. I am aware of the patent to Eustis 660,791 and expressly disclaim the clip strainer therein shown.

Having described my invention what I claim is:

1. A strainer for vessels comprising a straining device, and a clip attached thereto, said clip being formed of a length of wire folded upon itself at its middle to form portions extending inwardly over the strainer, said wire then being bent directly under and extended outward directly beneath and in a vertical plane with the inwardly extending portions of the clip above, and then being bent downwardly to engage the wall of the straining device.

2. A strainer for vessels comprising an outer shell of imperforate material open at bottom and top, an inner shell of perforate material, and a clip, said clip formed of a length of wire folded upon itself at its middle, the open ends of said wire being held between the outer and inner shell, and the parallel portions of said wire thence extending through the outer shell and up to the rear of the strainer, thence inward over the open top of the strainer, thence bent vertically upward and then forward in vertical plane with the wire beneath to the said middle fold of the wire.

In testimony whereof, I have signed my name to this specification in the presence of two subscribing witnesses, this sixth day of Mar., 1907.

HARRY G. PORTER.

Witnesses:
WM. H. MARSH,
L. A. SPALDING.